United States Patent Office 3,346,544
Patented Oct. 10, 1967

3,346,544
VULCANIZATION ACCELERATORS
Kamal Naguib Ayad, Wrexham, and Alan Jeffrey Neale, Llangollen, Wales, assignors to Monsanto Company, a corporation of Delaware
No Drawing. Original application Sept. 5, 1963, Ser. No. 306,707. Divided and this application Oct. 26, 1966, Ser. No. 589,538
Claims priority, application Great Britain, Sept. 17, 1962, 35,256/62
20 Claims. (Cl. 260—79.5)

This is a division of application Ser. No. 306,707, filed Sept. 5, 1963, now abandoned. This invention relates to new chemical compounds that are useful for example as vulcanization accelerators, and to a novel process for the vulcanization of rubber.

The most widely used rubbers such as for instance natural rubber and the styrene-butadiene synthetic rubbers are commonly vulcanized by heating with sulfur or a sulfur-containing vulcanizing agent. It is an established procedure to incorporate in the rubber prior to vulcanization a material that will increase the rate of vulcanization, and several types of chemical compounds having vulcanization accelerator activity are employed.

The present invention provides new chemical compounds containing a pyridthione or tautomeric mercaptopyridine system which possess activity as vulcanization accelerators to a high degree.

The new compounds of the invention are those containing a 1-(aminoalkyl)pyridthione, or alkoxycarbonylthiopyridine structure, typical compounds being for instance 1-(diethylaminomethyl)pyrid-2-thione, which has the formula:

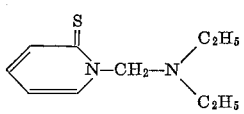

and ethoxycarbonylthio-2-pyridine, which has the formula:

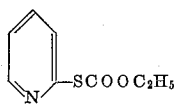

The invention includes a process for the vulcanization of a sulfur-vulcanizable rubber, in which a compound containing a 1-(aminoalkyl)pyridthione, or alkoxycarbonylthiopyridine structure is incorporated into the rubber together with sulfur or a sulfur-containing vulcanizing agent, and the mixture is heated to effect vulcanization.

Also part of the invention is a composition comprising a sulfur-vulcanizable rubber and a compound containing a 1-(aminoalkyl)pyridthione, or alkoxycarbonylthiopyridine structure.

The new compounds containing a 1-(aminoalkyl)pridthione structure include the 1-(aminoalkyl)pyridthiones themselves, and for example compounds containing more than one thionepyrid-1-yl-alkylamino group such as for instance the N,N'-bis(thionpyrid-1-ylalkyl)alkylenediamines, and compounds where the pyridine ring is part of polycyclic system, as for instance in the 1-(aminoalkyl)quinolinethiones. The thione group is often preferably in the 2-position of the pyridine ring, but can for instance be in the 4-position.

The alkyl portion of the aminoalkyl group can have a straight, branched or cyclic chain. Where it has a straight or branched chain, it is usually a lower alkyl group, for instance a methyl, ethyl, isopropyl or butyl group, and compounds where the aminoalkyl group is an aminoethyl group are often preferred.

The amino portion of the aminoalkyl group can be a primary amino group —NH$_2$, but is more usually a secondary amino group —NHR or a tertiary amino group —NRR'. The groups R and R' can each be aliphatic or aromatic, or, in the group —NRR', can together form a ring with the nitrogen atom; in compounds containing more than one thionepyrid-1-ylalkylamino group, R or R' is usually an aliphatic, aromatic or cyclic system having a thione-pyrid-1-ylalkylamino group as a substituent.

In preferred compounds, the amino group is usually a tertiary amino group —NRR' in which R and R' are each an alkyl group such as for instance a methyl, ethyl, isopropyl, butyl or hexyl group, a cycloalkyl group such as for instance a cyclohexyl group, an aralkyl group such as for instance a benzyl group (or an alkyl, cycloalkyl or aralkyl group having a thionepyrid-1-ylalkylamino substituent); or an amino group —NRR' in which R and R' form a saturated ring with the nitrogen atom, for instance a pyrrolidine, piperidine, hexamethyleneimine or morpholine ring. Such a ring can contain a further nitrogen atom, as for instance in a piperazine ring, to which is linked a second thionepyrid-1-ylalkyl group.

In the new compounds containing an alkoxycarbonylthiopyridine structure, the sulfur atom of the thiopyridine is attached to an alkoxycarbonyl group of which the alkyl group can have a straight or branched chain. Preferably it is a lower alkyl group, that is one containing from 1 to 4 carbon atoms, for instance a methyl, ethyl or isopropyl group. The alkyl group can however be a higher alkyl group, for instance one containing 6, 8 or even 12 carbon atoms. Alternatively, the alkyl group can be a cyclohexyl group for instance a cyclohexyl or methyl cyclohexyl group.

The new compounds include members where the pyridine ring (or any ring to which the pyridine ring is attached in a polycyclic system) contains a substituent such as for instance a halogen atom or an alkyl group.

Specific examples of the new compounds of the invention are: 1-(anilinomethyl)pyrid-2-thione, 1-(diethylaminomethyl)-pyrid-2-thione, 1-(morpholinomethyl)pyrid-2-thione, 1-(piperidinomethyl)pyrid-2-thione, 1-(morpholinomehtyl)pyrid-4-thione, N,N'-(2-thionepyrid-1-ylmethyl)ethylenediamine, N,N'-bis(2-thionepyrid-1-ylmethyl)piperazine, cyclohexyloxycarbonylthio-2-pyridine, ethoxycarbonylthio-2-pyridine and ethoxycarbonylthio-2-quinoline.

The new compounds of the instruction containing a 1-(aminoalkyl)pyridthione structure can be produced for example by the reaction of a pyridthione with an appropriate halogen-alkylamine, usually in the presence of a hydrogen halide acceptor. Where the aminoalkyl group in a new compound is an aminomethyl group, an alternative and usually preferred method of production comprises the reaction, optionally in stages, of a pyridthione with formaldehyde and an amine.

The new compounds of the invention containing an alkoxycarbonylthiopyridine structure can be produced for example by the reaction of a metal salt, for instance an alkali metal salt, of a pyridthione (in its mercaptopyridine tautomeric form) with an appropriate alkyl haloformate.

The new compounds can be used as accelerators in the vulcanization of natural rubber and the sulfur-vulcanizable synthetic rubbers. Such synthetic rubbers include polymers of 1,3-butadienes, for instance 1,3-butadiene itself and of isoprene, and copolymers of 1,3-butadienes with other monomers, such as styrene, acrylonitrile, isobutylene or methyl methacrylate.

The amount of sulfur or sulfer-containing vulcanizing agent employed in the vulcanization process of the present invention can be that conventionally employed in the vulcanization of the particular rubber concerned, and is usually from about 0.2 to about 10 parts, for instance about 0.5 to about 5 parts, by weight per hundred parts by weight of rubber. Sulfur-containing vulcanizing agents that can be employed include for instance amine disulfides and thiuram disulfides.

Generally from about 0.05 to 5 parts, for instance about 0.1 to about 2 parts, by weight of the new compound per 100 parts by weight of rubber are satifactory in the vulcanization process, although amounts outside these limits can be used if desired.

Compounding of the rubber prior to vulcanization can be carried out by conventional means, using for example a roll mill or an internal mixer. Normally other commonly used ingredients, such as for instance zinc oxide, stearic acid, a filler and an antioxidant will also be incorporated into the rubber prior to vulcanization. The vulcanization proper, in which the compound mixture is heated, is carried out at a temperature appropriate to the particular rubber concerned, for example at a temperature of about 135–155° C. Where the composition is based on natural rubber, or at a temperature of about 140–160° C. where the composition is based on a styrene-butadiene rubber.

The invention is illustrated by the following examples:

EXAMPLE 1

This example describes the production of the new compound 1-(morpholinomethyl)pyrid-2-thione.

A suspension of 8.6 grams (0.0775 mol.) of 2-mercaptopyridine (pyrid-2-thione) in 30 cc. of acetone was added during 10 minutes to a stirred solution of 6 grams of a 37% w./w. aqueous solution of formaledhyde (containing 0.0775 mol. $CH_2O$) and 6.7 grams (0.0775 mol.) of morpholine at 5–10° C. The mixture was allowed to stand at room temperature for 3 hours, the acetone then distilled off, and the residue was extracted with ether. The ether extracts were dried and the ether was evaporated giving 12.7 grams of cured 1-(morpholinomethyl)-pyrid-2-thione as a residue which solidified on scratching. The product was obtained as crystals having a melting point of 52–53° C. on recrystalization from 40–60 petroleum ether. (Found: C, 56.7; H, 6.5; N, 13.1; S, 15.3. $C_{10}H_{14}N_2OS$ requires C, 57.1; H, 6.67; N, 13.3; S, 15.2%.

EXAMPLE 2

This example describes tests used in making a preliminary assessment of the accelerator properties of a test compound, and gives the results obtained in comparing 1-(morpholinomethyl)pyrid-2-thione with bis(2-benzthiazyl)-disulfide (MBTS), an established vulcanization accelerator, and showing its high accelerator activity in a white rubber stock.

The following mixes were prepared by compounding on a mill. The figures indicate parts by weight.

|  | Mix A | Mix B |
|---|---|---|
| Pale Crepe | 100 | 100 |
| Zinc Oxide | 3 | 3 |
| Stearic Acid | 1 | 1 |
| Sulfur | 2.5 | 2.5 |
| 1-(morpholinomethyl)pyrid-2-thione | 1.5 |  |
| MBTS |  | 1.5 |

Each mix was allowed to stand for 24 hours before being tested.

In test method I, a 50 gram sample of the mix under test was placed in a Mooney plastometer fitted with a "large" rotor, according to British Standard Specification No. 1673, Part 3, 1951. The time taken for the reading of the instrument to increase to 100 units at a temperature of 140° C.±1° C. was recorded, this time being inversely related to the accelerator activity of the compound under test.

In test method II, the degree of vulcanization of a mix after various cure times at 160° C. was determined by measuring the extent to which a cured sample swelled on immersion in benzene for 24 hours at room temperature, the extent of swelling being inversely proportional to the degree of vulcanization (or cross-link formation). The procedure was that of British Standard Specification 903, Part A16, Method C, using strips cured in 1 mm. x ½ inch x 4 inch moulds.

The results given in the table below show the very fast rate of cure obtained with 1-(morpholinomethyl)pyrid-2-thione together with a degree of cross-link formation superior to that given by the established accelerator.

| Mix | Test I Mooney Plastometer Time to Reach 100 Units (minutes) | Test II Percent Swelling in Benzene Cure Time (minutes) | | |
|---|---|---|---|---|
|  |  | 7.5 | 15 | 30 |
| A | 2 | 69 | 71 | 71 |
| B | 22 | 71 | 73 | 76 |

EXAMPLE 3

This example describes the production of the new compound 1-(morpholinomethyl)pyrid-4-thione.

12.3 grams of a 36.5% w./w. aqueous solution of formaldehyde (containing 0.15 mol. of $CH_2O$) was added with stirring to 13.1 grams (0.15 mol.) of morpholine. The stirred mixture was then treated with a suspension of 16.7 grams (0.15 mol.) of 4-mercaptopyridine (pyrid-4-thione) in 50 cc. of acetone at 5–10° C. The mixture was allowed to stand at room temperature for one hour and the product was filtered off and dried. It consisted of 15.8 grams (50.1% of theoretical yield) of 1-(morpholinomethyl)-pyrid-4-thione. A small sample when recrystallized from a mixture of benzene and a petroleum ether having a boiling range 60–80° C. was found to have a melting point of 107–108° C. (Found: C, 57.55; H, 6.51; N, 13.5; S, 15.39%. $C_{10}H_{14}N_2OS$ requires: C, 57.1; H, 6.67; N, 13.3; S, 15.2%.)

EXAMPLE 4

This example describes the production of the new compound ethoxycarbonylthio-2-pyridine.

To a stirred suspension of 20 grams (1.5 mol.) of the sodium salt of 2-mercaptopyridine (pyrid-2-thione) in 60 cc. of anhydrous benzene was slowly added 16.3 grams of ethyl chloroformate (1.5 mol.) over a period of 5 minutes, the temperature being maintained at between 16 and 35° C. The mixture was then heated under reflux for one hour, and after being allowed to stand at room temperature overnight the liquid was filtered and the solvent removed from the filtrate by distillation under reduced pressure. The residue consisted of 20.1 grams (73.2% of theoretical yield) of crude ethoxycarbonylthio-2-pyridine which was purified by distillation under reduced pressure. The purified material had a boiling point of 100° C. at a pressure of 0.7 millimeter of mercury, and a refractive index $n^{21}_D$ of 1.5448. (Found: C, 52.81; H, 4.8; N, 7.68; S, 17.8%. $C_8H_9NO_2S$ requires: C, 52.45; H, 4.9; N, 7.65; S, 17.5%.)

EXAMPLE 5

This example describes tests used to demonstrate the accelerator activity of 1-(morpholinomethyl)pyrid-4-thione, and compares this compound with the established vulcanization accelerator bis(2-benzthiazyl)disulfide (MBTS).

The following mixes were prepared by compounding on a mill. The figures indicate parts by weight.

| | Mix C | Mix D |
|---|---|---|
| Pale Crepe | 100 | 100 |
| Zinc Oxide | 3 | 3 |
| Stearic Acid | 1 | 1 |
| Sulfur | 2.5 | 2.5 |
| 1-(morpholinomethyl)pyrid-4-thione | 1.5 | |
| MBTS | | 1.5 |

The mixes were allowed to stand for 24 hours before being tested.

The tests described in Example 2 were then applied to each of the mixes, and the results, given in the table below; demonstrated that 1-(morpholinomethyl)pyrid-4-thione had a useful degree of accelerator activity of the same order as that of the established accelerator MBTS.

| Mix | Test I | Test II | | |
|---|---|---|---|---|
| | Mooney Plastometer Time to Reach 100 Units (minutes) | Percent Swelling in Benzene Cure Time (minutes) | | |
| | | 7.5 | 15 | 30 |
| C | 18½ | 85 | 75 | 76 |
| D | 14½ | 70 | 72 | 75 |

EXAMPLE 6

This example describes tests used to demonstrate the accelerator activity of ethoxycarbonylthio-2-pyridine, and compares this compound with the established vulcanization accelerator bis(2-benzthiazyl)disulfide (MBTS).

The following mixes were prepared by compounding on a mill. The figures indicate parts by weight.

| | Mix G | Mix H |
|---|---|---|
| Pale Crepe | 100 | 100 |
| Zinc Oxide | 3 | 3 |
| Stearic Acid | 1 | 1 |
| Sulfur | 2.5 | 2.5 |
| Ethoxycarbonylthio-2-pyridine | 1.5 | |
| MBTS | | 1.5 |

The mixes were allowed to stand for 24 hours before being tested.

The tests described in Example 2 were then applied to each of the mixes, and the results, given in the table below, demonstrated that ethoxycarbonylthio-2-pyridine had accelerator activity considerably greater than that of the established accelerator MBTS.

| Mix | Test I | Test II | | |
|---|---|---|---|---|
| | Mooney Plastometer Time to Reach 100 Units (minutes) | Percent Swelling in Benzene Cure Time (minutes) | | |
| | | 7.5 | 15 | 30 |
| G | 4 | 70 | 73 | 75 |
| H | 12¾ | 70 | 71 | 75 |

It is intended to cover all changes and modifications of the examples of the invention herein chosen for purposes of disclosure which do not constitute departures from the spirit and scope of the invention.

What is claimed is:

1. A compound of formula $R(A-R')_n$ where $n$ is an integer equal to the valence of R and R is an amino radical, nitrogen of which is attached to A and is 1,4-piperazinyl, morpholino,

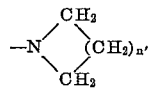

where $n'$ is an integer at least 2 but less than 5, or

where X and Y are hydrogen, alkyl of 1–6 carbon atoms inclusive, cyclohexyl, benzyl or phenyl, A is lower alkylene, and R' is an amino radical nitrogen of which is attached to A and is a thionopyridyl radical or a thionoquinolyl radical.

2. 1-(aminomethylene)pyridthione.
3. 1-(aminomethylene)pyrid-2-thione.
4. 1-(lower alkylaminomethylene)pyridthione.
5. 1-[di-(lower alkyl)aminomethylene]pyridthione.
6. A compound of the formula

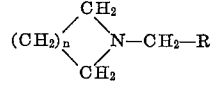

where $n$ is an integer at least 2 but less than 5 and R is pyridthione nitrogen which is attached to the $CH_2$.

7. 1-(morpholinomethyl)pyridthione.
8. 1-(morpholinomethyl)pyrid-2-thione.
9. 1-(morpholinomethyl)pyrid-4-thione.
10. A compound of the formula

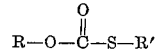

where R is a straight or branched chain alkyl of 1–12 carbon atoms inclusive, cyclohexyl or methylcyclohexyl and R' is 2-pyridyl or 2-quinolyl.

11. Ethoxycarbonylthio-2-pyridine.
12. A process for the production of a 1-(aminomethyl) pyridthione which comprises reacting a pyridthione with formaldehyde and an amine.
13. A process for the production of 1-(morpholinomethyl)pyrid-2-thione which comprises reacting pyrid-2-thione with formaldehyde and morpholine.
14. A process for the production of 1-(morpholinomethyl)pyrid-4-thione which comprises reacting pyrid-4-thione with formaldehyde and morpholine.
15. A process for the production of a compound containing an alkoxycarbonylthiopyridine structure which comprises reacting a metal salt of mercaptopyridine with an appropriate alkyl chloroformate.
16. A process for the production of ethoxycarbonylthio-2-pyridine which comprises reacting sodium salt of 2-mercaptopyridine with ethyl chloroformate.
17. A process for the vulcanization of a sulfur-vulcanizable rubber which comprises incorporating into the rubber a vulcanizing agent and an accelerating amount of a compound of the formula $R(A-R')_n$ where $n$ is an integer equal to the valence of R and R is an amino radical nitrogen of which is attached to A and is 1,4-piperazinyl, morpholino,

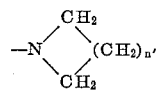

where $n'$ is an integer at least 2 but less than 5, or

where X and Y are hydrogen, alkyl of 1–6 carbon atoms inclusive, cyclohexyl, benzyl or phenyl, A is lower alkylene, and R' is an amino radical nitrogen of which is attached to A and is a thionopyridyl radical or a thionoquinolyl radical.

18. A process for the vulcanization of a sulfur-vulcanizable rubber which comprises incorporating into the rubber a vulcanizing agent and an accelerating amount of 1-(morpholinomethyl)pyridthione.

19. A process for the vulcanization of a sulfur-vulcanizable rubber which comprises incorporating into the rubber a vulcanizing agent and an accelerating amount of a compound of the formula

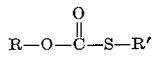

where R is a straight or branched chain alkyl of 1–12 carbon atoms inclusive, cyclohexyl or methylcyclohexyl and R' is 2-pyridyl or 2-quinolyl.

20. A process for the vulcanization of a sulfur-vulcanizable rubber which comprises incorporating into the rubber a vulcanizing agent and an accelerating amount of ethoxycarbonylthio-2-pyridine.

No references cited.

JOSEPH L. SCHOFER, *Primary Examiner.*

D. K. DENENBERG, *Assistant Examiner.*